Oct. 29, 1968 W. W. DAVIS 3,407,492
METHOD OF FABRICATING A TUBULAR THIN-FILM MEMORY DEVICE
Original Filed Jan. 30, 1963 4 Sheets-Sheet 1

INVENTOR
WILLIAM W. DAVIS
BY Thomas J. Nikolai
ATTORNEY

Oct. 29, 1968 W. W. DAVIS 3,407,492

METHOD OF FABRICATING A TUBULAR THIN-FILM MEMORY DEVICE

Original Filed Jan. 30, 1963 4 Sheets-Sheet 2

United States Patent Office 3,407,492
Patented Oct. 29, 1968

3,407,492
METHOD OF FABRICATING A TUBULAR THIN-FILM MEMORY DEVICE

William W. Davis, Minneapolis, Minn., assignor to Sperry Rand Corporation, New York, N.Y., a corporation of Delaware
Original application Jan. 30, 1963, Ser. No. 254,913, now Patent No. 3,276,000, dated Sept. 27, 1966. Divided and this application Feb. 23, 1966, Ser. No. 529,362
5 Claims. (Cl. 29—604)

ABSTRACT OF THE DISCLOSURE

A method of forming a plurality of circumferential memory areas in a tubular magnetizable memory element deposited around the web formed between two spaced-apart apertures in a nonmagnetizable base member, each of said memory areas being defined by corresponding superposed portions of printed circuit conductors on opposing surfaces of said base member.

CROSS-REFERENCE TO RELATED APPLICATION

The present invention is a divisional application of my parent application Serial No. 254,913, filed Jan. 30, 1963, now Patent No. 3,276,000; the invention herein described was made in the course of, or under a contract or subcontract thereunder, with the Department of the Air Force.

BACKGROUND OF THE INVENTION

The value of the utilization of small cores of magnetizable material as logical memory elements in electronic data processing systems is well known. As used herein, the term "magnetizable material" shall refer to a material having the characteristic of magnetic remanence, the term being sufficiently broad to encompass material having a substantially rectangular hysteresis loop characteristic. This value is based upon the bistable characteristics of magnetizable cores which include the ability to remain or remember magnetic conditions which may be utilized to indicate a binary "1" or "0." As the use of magnetizable cores in electronic data processing equipment increases, a primary means of improving the computational state of these machines is to utilize memory elements which possess the property of nondestructive readout, for by retaining the initial state of remanent magnetization after readout, the rewrite cycle required with destructive readout devices is eliminated. As used herein, the term "nondestructive readout" shall refer to the sensing of the relative direction or state of the remanent magnetization of the magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present invention, it should be understood that such cores are capable of being magnetized to saturation in either of two directions. Furthermore, these cores are formed of a selected magnetizable material having a rectangular hysteresis characteristic which ensures that after the core has been saturated in either direction a definite point of magnetic remanence representing the residual flux density in the core will be retained. The residual flux density representing the point of magnetic remanence in a core possessing such characteristic is preferably of substantially the same magnitude as that of its maximum saturation flux density. These core elements are usually connected in circuits providing one or more input coils for purposes of switching the core from one magnetic state corresponding to a particular direction of saturation, i.e., positive saturation, denoting a binary "1," to the other magnetic state, corresponding to the opposite direction of saturation, i.e., negative saturation, denoting a binary "0." One or more output coils are usually provided to sense when the core switches from one state of saturation to the other. Switching can be achieved by passing a current pulse of sufficient magnitude through the input winding in a manner so as to set up a magnetic field in the area of the core in the sense opposite to the preexisting flux direction, thereby driving the core to sauration in the opposite direction of polarity, i.e., of positive to negative saturation. When the core switches, the resulting magnetic field variation induces a signal in the other windings in the core such as, for example, the above mentioned output or sense windings. The material for the core may be of various magnetizable materials such as those known as Mumetal, Permalloy, or the ferromagnetic ferrites, such as that known as Ferramic.

Extensive research has been expended upon developing memory elements which lend themselves to fast, economical fabrication and assembly into three-dimensional memory arrays. Thin ferromagnetic films such as fabricated in accordance with S. M. Rubens Patent No. 2,900,282, and assembled into three-dimensional memory arrays, such as disclosed in S. M. Rubens et al. Patent No. 3,030,612, have achieved high bit densities. V. J. Korkowski in his application Ser. No. 206,864, filed July 2, 1962, now Patent No. 3,192,512, and assigned to the assignee of this invention, discloses transfluxor-type memory elements that are formed by the deposition of magnetizable material upon a nonmagnetizable base member.

SUMMARY OF THE INVENTION

This invention is a further improvement in the development of high bit-density three-dimensional magnetic memory element arrays. It concerns a tubular thin film of magnetizable material having single domain properties supported on the web between a pair of apertures in a supporting base member. As regards this application, the term "single domain properties" may be considered the characteristic of a three-dimensional element of magnetizable material having a thin dimension which is substantially less than the width and length thereof wherein no domain wall can exist parallel to the large surface of the element. The memory element possesss the magntic characteristic of uniaxial anisotropy having a preferred, or easy axis, along which the element's remanent magnetization lies. This easy axis is in the circumferential direction following the closed flux path while the orthogonal hard axis lies along the element's longitudinal axis. Binary information is written into the memory element by orienting the remanent flux in a clockwise or counterclockwise direction along the easy axis in the manner disclosed by the hereinbefore referenced Rubens et al. Patent No. 3,030,612. Readout of the stored binary information is destructive, and is achieved by applying a strong transverse field, or a field along the memory element's hard axis, in the manner of achieving the ternary, demagnetized state of my copending patent application, Ser. No. 127,092, filed July 25, 1961, now abandoned and assigned to the assignee of the present invention. As used herein, the term "transverse" shall mean a substantially orthogonal or perpendicular relationship. A plurality of parallel word line pairs envelop the tubular element at right angles to its longitudinal axis causing discrete circumferential areas coupled by each word line pair to behave as individual memory elements.

The present invention is an improvement invention over the memory elements disclosed in the publication "High Speed Digital Storage Using Cylindrical Magnetic Films," G. R. Hoffman et al., Journal of British Institute of Radio Engineers, volume 20, 1960, pp. 31–36. The memory element of the above publication utilizes a cylindrical magnetizable memory element through which lines carrying the write and readout signals are threaded. However, in that arrangement the use of the best techniques of the printed circuit and magnetizable material deposition arts are not possible due to the construction of the plated cylindrical element. The present invention permits an integral memory element-conductor arrangement permitting very high bit-densities.

Accordingly, it is a primary object of this invention to provide a method of fabricating a novel memory element.

Another object of this invention is to provide a method of fabricating a tubular memory element formed by depositing magnetizable material around a web formed by two spaced-apart apertures in a supporting base wherein printed circuit drive and sense lines thread the element and a plurality of parallel printed circuit drive lines coupled the element orthogonal to its longitudinal center line.

Another object of this invention is to provide a method of fabricating a tubular memory element having a plurality of printed-circuit drive lines and a single printed circuit sense line wherein both the memory element and the printed circuit lines are formed as an integral unit using metal treating and printed circuit techniques.

Another object of this invention is to provide a method of fabricating a tubular memory element coupled by a plurality of parallel printed circuit drive lines, each drive line defining a discrete area of the element which area is capable of storing discrete binary information.

A further object of this invention is to provide a method of fabricating an integral magnetizable memory element capable of storing a plurality of discrete binary data defined by the magnetic states of predetermined discrete areas thereof, said areas capable of operating in the single-domain rotational switching mode.

DESCRIPTION OF THE PREFERRED EMBODIMENT

Figure 1:
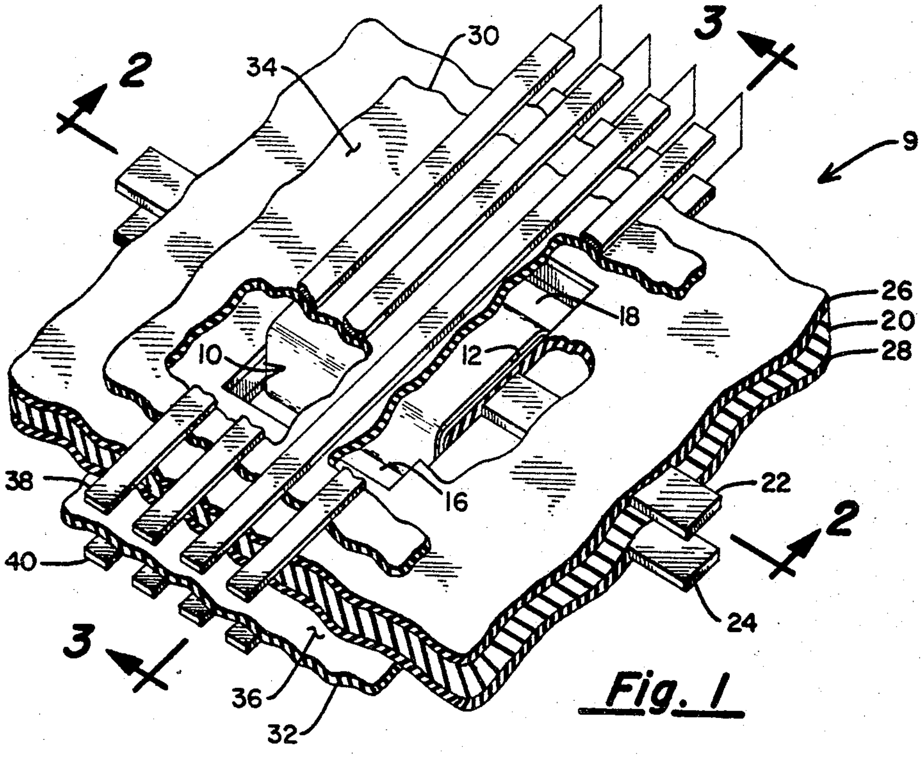
FIG. 1 is a trimetric view of a preferred embodiment of a memory apparatus proposed by the present invention.

Referring now to the drawings wherein like reference numbers designate similar components, and more particularly to FIG. 1, there is illustrated a preferred embodiment of a memory apparatus 9 proposed by the present invention. Memory element 10 is formed by depositing magnetizable material 12 around a web 14 (see FIG. 3) which is formed by spaced-apart apertures 16 and 18 in substrate 20 which substrate is preferably of a nonconductive, i.e., insulative, and nonmagnetizable material. Printed circuit sense line 22 and printed circuit digit line 24, which are formed in a substantially parallel relationship on opposing surfaces of substrate 20 and which are insulated from magnetizable material 12 by insulating layers 26 and 28, respectively, thread memory element 10 affording intimate magnetic coupling therebetween. Finally, this assembly is sandwiched between printed circuit means 30 and 32 having substrate means 34 and 36 and a plurality of printed circuit conductors, or lines, 38 and 40, respectively, corresponding superposed ones of which are intercoupled at one end to form continuous word lines coupling opposite portions of memory element 10. The conductors 38 and 40, which are disposed in substantially parallel relationship, are arranged transverse to conductors 22 and 24.

Although the preferred embodiment of FIG. 1 illustrates an arrangement whereby memory apparatus 9 is formed utilizing two spaced-apart apertures with each aperture pair providing a web which when coated with magnetizable material 12 forms one memory element 10, such a construction is not to be construed as a limitation thereto. Alternatively, a compact memory apparatus could be constructed utilizing a plurality of aligned, equally spaced-apart apertures in the substrate member with a memory element formed by depositing magnetizable material upon each web therebetween. In this arrangement a plurality of N aligned, equally spaced-apart apertures would permit forming $N-1$ memory elements as compared to the illustrated embodiments' $N/2$ memory elements.

Figure 2:
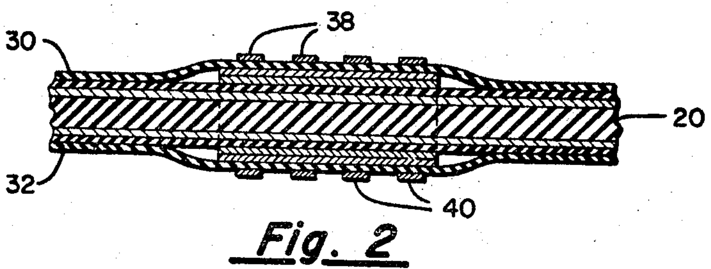
FIG. 2 is an illustration of a cross-sectional view of the memory apparatus of FIG. 1 taken normal to the word lines showing the stacked relationship of the components thereof.
Figure 3:
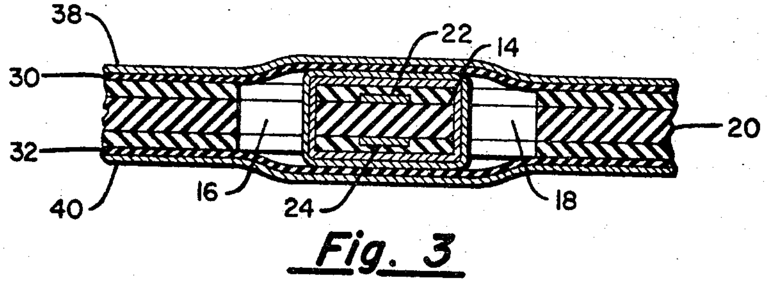
FIG. 3 is an illustration of a cross-sectional view of the memory apparatus of FIG. 1 taken normal to the sense and digit lines showing the stacked relationship of the components thereof.

Referring now to FIGS. 2 and 3, there are illustrated cross-sectional views of the memory apparatus 9 presenting a diagrammatic illustration of the stacked relationship of the components of FIG. 1. Referring to FIG. 2, there is shown a cross-sectional view of memory apparatus 9 taken normal to printed circuit conductors 38 and 40 and to FIG. 3 wherein there is shown a cross-sectional view of memory apparatus 9 taken normal to printed circuit conductors 22 and 24. In a typical embodiment substrate 20 may be a 0.0005 inch thick sheet of polyethylene terephthalate with printed circuit conductors 22 and 24 being 0.0014 inch thick layers of copper insulated from memory element 10 by insulative layers 26 and 28, respectively. Insulative layers 26 and 28 may be formed from an epoxy resin which may be applied by brushing, spraying or dipping or, alternatively, from a sheet of insulating material, which sheet may have a thickness of approximately 0.00025 inch and be composed of polyethylene terephthalate. The sheet of insulation may be affixed to the substrate 20 by a suitable adhesive material. Memory element 10 is composed of a magnetizable material 12 which may be formed upon web 14 by an electroplating process such as is described hereinafter. The thickness of the magnetizable material 12 may be of any desired dimension as determined by the fabricating techniques used and the desired operating mode of the memory element 10. In the preferred embodiment this thickness is in the range of 1000 to 2000 angstroms.

Substrate means 34 and 36 may be formed of 0.00025 inch thick sheets of polyethylene terephthalate with printed circuit lines 38 and 40 being 0.0014 inch thick layers of copper. Substrate means 34 and 36 may be affixed to the insulating layers 26 and 28 and a portion of the magnetizable material 12 by a suitable adhesive material making certain that corresponding pairs of lines 38 and 40 of substrate means 34 and 36, respectively, are oriented in a superposed, parallel relationship in the area of memory element 10 and orthogonal to the longitudinal axis thereof. In this arrangement the apertures in substrate 20 may be filled with the adhesive material used to affix substrate means 34 and 36 to the insulating layers 26 and 28 and the magnetizable material 12.

In view of the above remarks, it is to be understood that the illustrations of FIGS. 2 and 3 are not intended to represent actual or comparative dimensions or sizes but is presented to better understand the illustrated embodiment of FIG. 1.

Figure 4:
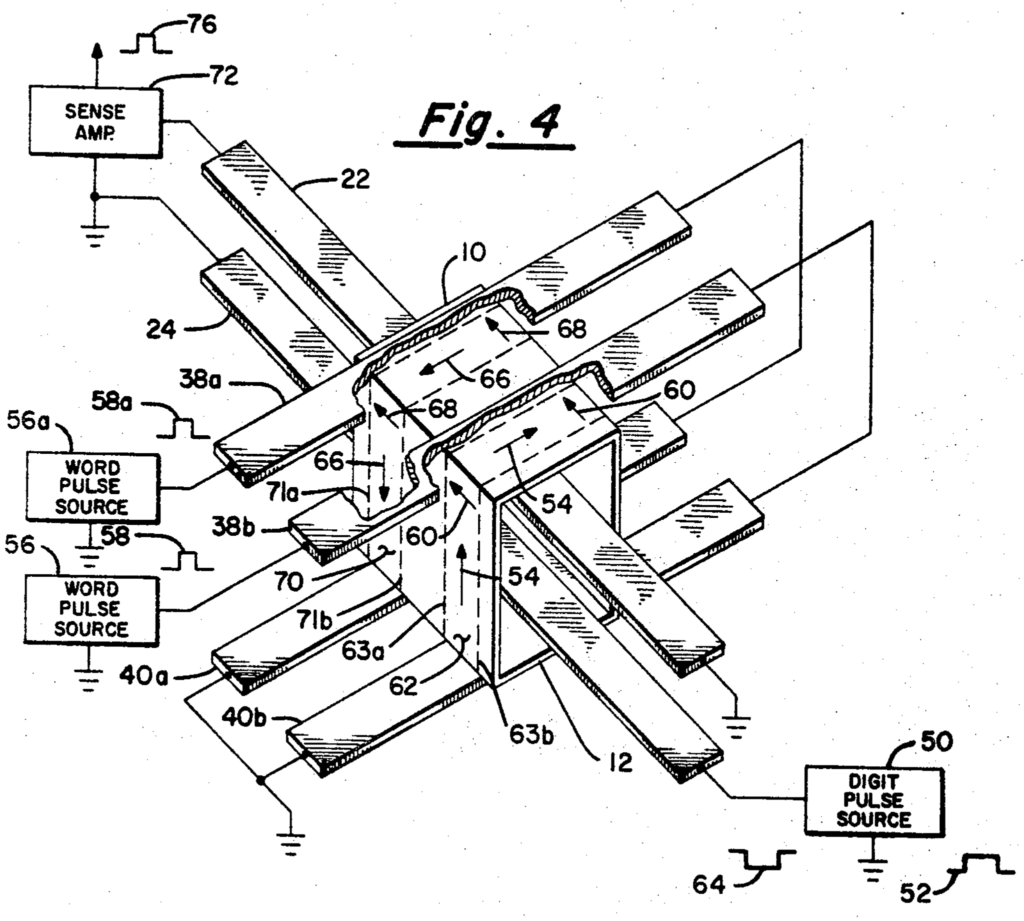
FIG. 4 is a diagrammatic illustration of the memory apparatus of FIG. 1 omitting the insulating layers and supporting means for clarity.

Operation of memory element 10 in the write and readout modes shall be discussed with reference to FIGS. 4 and 5. FIG. 4 is a diagrammatic illustration of the preferred embodiment of FIG. 1 wherein the necessary insulating layers and supporting means are omitted for clarity. Memory element 10 is threaded by sense line 22 and digit line 24 while word lines 38*a* and 38*b* run transversely over memory element 10, and return under memory element 10 by way of corresponding word lines 40*a* and 40*b*, respectively. Word lines 38 and 40, being separated from memory element 10 by only insulating layers 34 and 36, respectively have intimate magnetic coupling therewith providing sharply defined discrete circumferential areas of memory element 10 which are determined by the superposed portions of the respective word lines. The closely spaced-apart relationship of word lines 38 and 40 to the memory element 10 ensures negligible flux fringing at the edges of the word lines and the gap between adjacent word lines ensures negligible word line signal interchange therebetween. The gap, or spacing, between adjacent word lines, for example, lines 38*a* and 38*b*, is a parameter of the memory element physical size, operating mode and drive signal amplitudes. However, by selecting a proper word line spacing a compact word line pattern may be achieved while realizing negligible word line cross talk and intimate word line, memory element coupling.

Operation of memory element 10 in the write mode involves the coincident application of transverse and longitudinal drive fields to achieve single domain rotational switching similar to that disclosed in the hereinbefore referenced Rubens et al. Patent No. 3,030,612.

Figure 5:
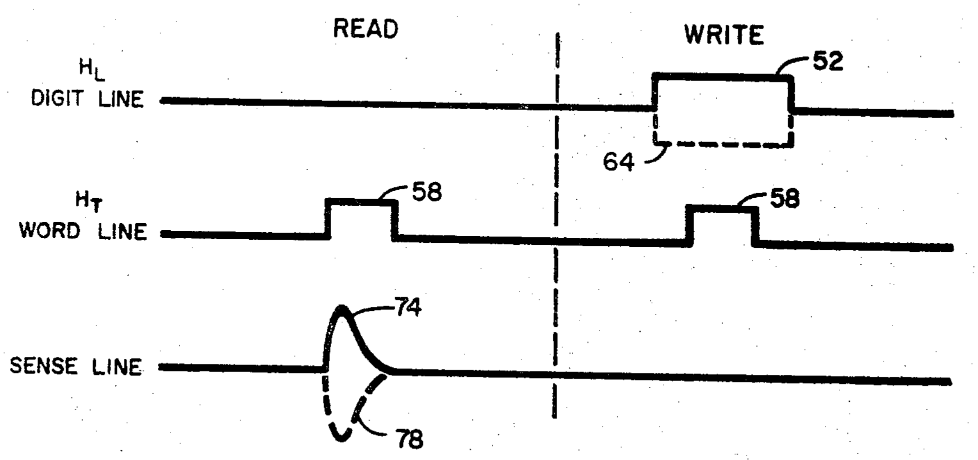
FIG. 5 is an illustration of the drive and readout signals of the memory apparatus of FIG. 1.

Writing of binary information into memory element 10 utilizes the write drive signals of FIG. 5. For the writing of a "1" digit pulse source 50 couples write "1" digit pulse 52 to digit line 24. This generates a clockwise field about digit line 24 in the area of memory element 10 as denoted by vectors 54. Now word pulse source 56 couples word pulse 58 to word line 38*b* which generates a left-wise field denoted by vectors 60 about word line 38*b* in the circumferential area 62 of memory element 10, which circumferential areas is bounded by the circumferential parallel lines 63*a* and 63*b*, as defined by the width of word line 38*b*. The magnetization of area 62, which area is then subjected to coincident fields represented by vectors 54 and 60, switches in a single domain rotational mode—in the manner of the above referenced Rubens et al. Patent No. 3,030,612—upon the termination of word pulse 58 and the retention of write "1" digit pulse 52 into a clockwise magnetic state as represented by vectors 54.

For the writing of a "0" pulse source 50 couples write "0" digit pulse 64 to digit line 24. This generates a counterclockwise field about digit line 24 in the area of memory element 10 as denoted by vectors 66. Now word pulse source 56*a* couples word pulse 58*a* to word line 38*a* which generates a left-wise field, denoted by vectors 68, about word line 38*a* in the circumferential area 70 of memory element 10 which circumferential area is bounded by the circumferential parallel lines 71*a* and 71*b* as defined by the width of word line 38*a*. The magnetization of area 70, which area is then subjected to coincident fields represented by vectors 66 and 68, switches as in the write "1" operation in a single domain rotational mode into a counterclockwise magnetic state as represented by vectors 66.

Reading of binary information from memory element 10 utilizes the readout signal of FIG. 5. For a readout operation word pulse source 56 couples word pulse 58 to the designated word line 38 with the resulting readout signal generated in sense line 22 and thence coupled to sense amplifier 72. For the readout of the binary "1" stored in area 62 word pulse source 56 couples word pulse 58 to word line 38*b* which generates a left-wise field about word line 38*b* in the circumferential area 62. The remanent magnetization of area 62, which is denoted by vectors 54, is rotated in the single domain rotational switching mode by this left-wise field about word line 38*b* into a substantially demagnetized, or ternary, state as explained in my aforementioned copending patent application Ser. No. 127,092. This switching of the remanent magnetization of area 62 generates a varying magnetic field coupling sense line 22 which produces a read "1" pulse 74 therein. Sense amplifier 72 which is phase polarity responsive to pulse 74 produces an output pulse 76 indicative of the readout of a binary "1."

For the readout of the binary "0" stored in area 70 word pulse source 56*a* couples word pulse 58*a* to word line 38*a* which generates a left-wise field about word line 38*a* in area 70. The remanent magnetization of area 70, which is denoted by vectors 66, is rotated in the single domain rotational switching mode by this left-wise field about word line 38*a* into a substantially demagnetized state as in the read "1" operation. This switching of the remanent magnetization of area 70 generates a varying magnetic field coupling sense line 22 which produces a read "0" pulse 78 therein. Sense amplifier 72, which is phase polarity nonresponsive to pulse 78, produces no output pulse indicative of the readout of a binary "0."

Figure 6:
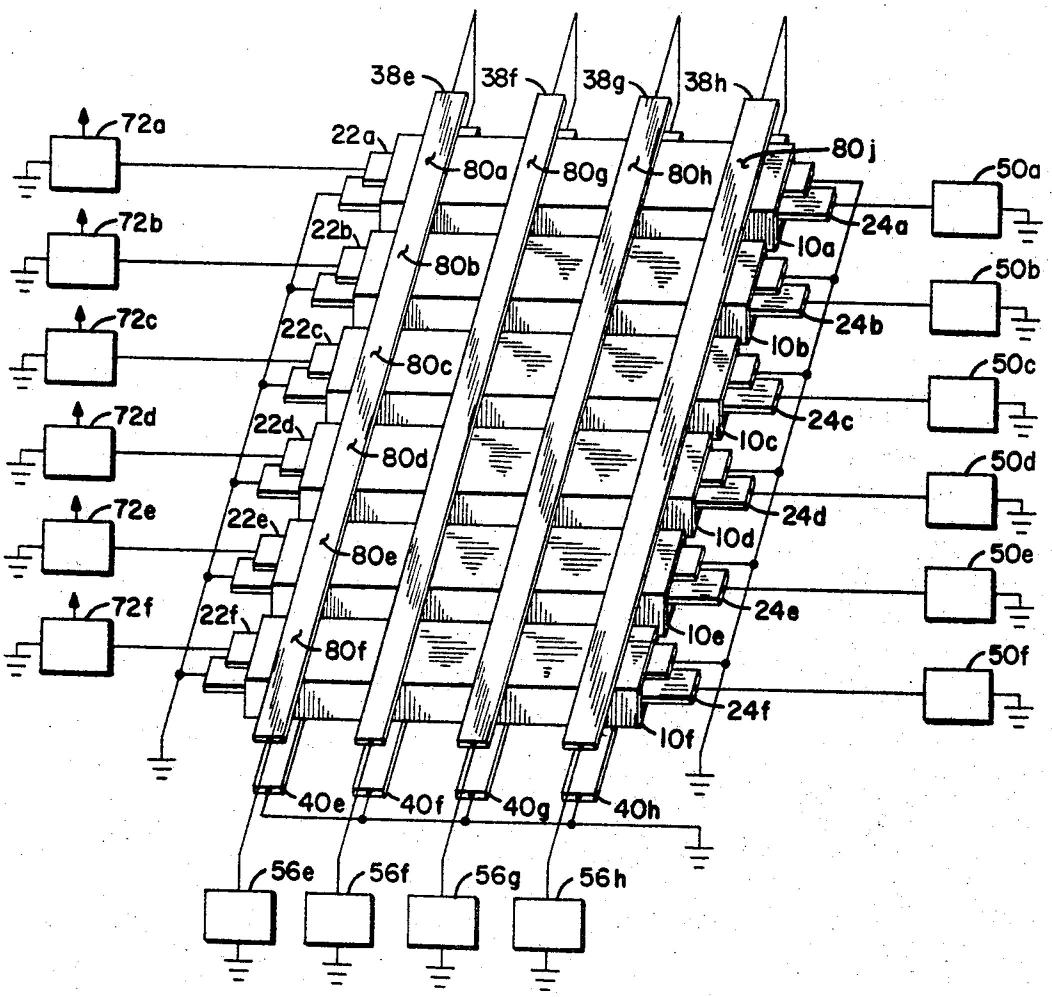
FIG. 6 is a trimetric view of a plurality of the FIG. 1 memory apparatus arranged in an array of four six-bit words.

Referring to FIG. 6, there is illustrated a trimetric view of a plurality of the FIG. 1 memory apparatus 9 arranged in an array permitting coincident-current writing and word-organized reading of four six-bit words. In the arrangement of FIG. 6, memory elements 10*a*, 10*b*, 10*c*, 10*d*, 10*e* and 10*f* lie in a first plane. However, it is apparent that correspondingly similar planes may be stacked in a superposed relationship to form a three-dimensional array. As in the embodiment of FIG. 4, words lie along the word lines, bits along the digit lines with each bit defined by the portions of the separately intercoupled memory element 10 sandwiched by the word line 38 and 40 pairs. Thus, by the coupling of the proper polarity write "1" digit pulse 52 or write "0" digit pulse 64 to the designated digit line 24 from digit pulse source 50 and the coupling of the word pulse 58 to the designated word line 38 and 40 pair a binary "1" or "0" may be written into any bit position of the memory array. By coupling the word pulse 58 to the designated word line 38 and 40 pair the information stored in those portions of memory elements 10 defined by the designated word line 38 and 40 pair is sensed by the respective sense line 22 of each memory element 10 which sense line 22 couples the generated signal to the corresponding sense amplifier 72.

It is apparent that the fields generated by a digit pulse 52 or 64 flowing through the designated digit line 24 couples all the bit designated circumferential areas of the associated memory element 10. For example, write "1" digit pulse 52 emanating from digit pulse source 50*a* and coupled to digit line 24*a* generates a field about the entire length of digit line 24*a*. This field is in the area of areas 80*a*, 80*g*, 80*h* and 80*j* which are circumferential areas along memory element 10*a* as discussed with respect to FIG. 4. Further, it is apparent that the field generated by a word pulse 58 flowing through the designated word line 38 and 40 pair couples all the bit designated circumferential areas associated therewith. For example, word pulse 58 emanating from word pulse source 56*e* and coupled to word line 38*e* and 40*e* pair generates a field along the entire length of word line 38*e* and 40*e* pair. This field is in the area of areas 80*a* through 80*f* which are circumferential areas of memory elements 10*a* through 10*f*, respectively. Assuming that it is desired to read out and rewrite the information defined by word line 38*e* and 40*e* pair it is apparent that for the readout operation word pulse 58 emanating from word pulse source 56*e* and coupled to word line 38*e* and 40*e* pair couples circumferential areas 80*a* through 80*f* switching such areas into the ternary, or substantially demagnetized, magnetic state as discussed hereinbefore. For the rewrite operation write "1" digit pulse 52 or write "0" digit pulse 64 must be coupled to the respective digit lines 24*a* through 24*f* from corresponding digit pulse sources 50*a* through 50*f*. Thus, although only those circumferential areas associated with the pulsed word line pair, i.e., areas 80*a* through 80*f*, receive a transverse field influence, all circumferential areas of memory elements 10*a* through 10*f* receive a longitudinal field influence from their pulsed digit lines. Consequently, it is apparent that the amplitudes and durations of word pulse 58 and digit pulses 52 and 64 are critical and are dependent upon the operating characteristics of the memory element array, the principal factors being the magnetic characteristics of the magnetizable material 12 and the physical dimensions of the memory element 10. In a typical embodiment a memory element 10, dimensions of 0.05 inch thick, 0.10 inch wide and 2.00 inches long, of 81 Ni–19 Fe material composition and of average 2000 angstroms thickness, produces a memory element 10 having circumferential areas 80 having a coercivity $H_c$=1.0 oersted and a uniaxial anisotropy, i.e., easy axis, field $H_k$=5.0 oersteds. With this embodiment the amplitudes of digit pulses 52 and 64 are adjusted to produce digit pulse field intensities of slightly less than $H_c$ or under 1.0 oersted and the amplitude of word pulse 58 is adjusted to produce a word pulse field intensity of slightly over $H_k$ or over 5.0 oersteds. Using these digit and word pulse fields, the remanent magnetization of those circumferential areas, receiving only a longitudinal digit field influence, is substantially unaffected; the remanent magnetization of those circumferential areas, receiving coincident longitudinal digit field and transverse word field influence, is switched into alignment with the circumferential area's easy axis, parallel or antiparallel as determined by the polarity of the digit field; and the remanent magnetization of those circumferential areas, receiving only a transverse word field influence, is rotated into the nonreversible switching zone about the circumferential area's hard axis and allowed to collapse thereabout resulting in the substantially demagnetized readout state.

It is apparent in the above discussion that the demagnetized readout state could be utilized as a ternary information state providing three informational states as discussed in my aforementioned copending patent application Ser. No. 127,092. In this embodiment sense amplifier means 72 could provide three distinct output signals, as for example: a positive pulse representative of a "1"; a negative pulse representative of a "0," and a ground voltage pulse representative of an "X," or ternary state.

Figure 7:
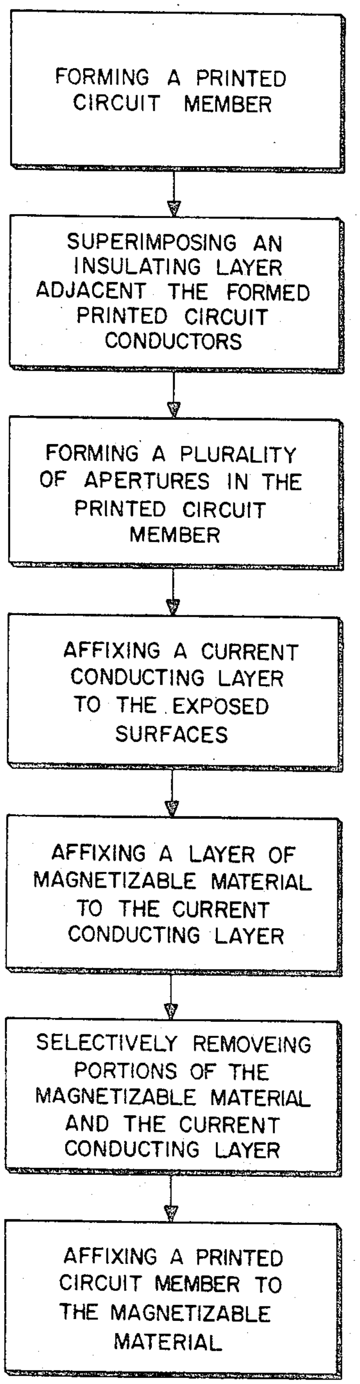
FIG. 7 is a flow diagram illustrating a typical series of steps that may be followed in preparing a memory apparatus in accordance with the preferred technique of the present invention.
Figure 8:
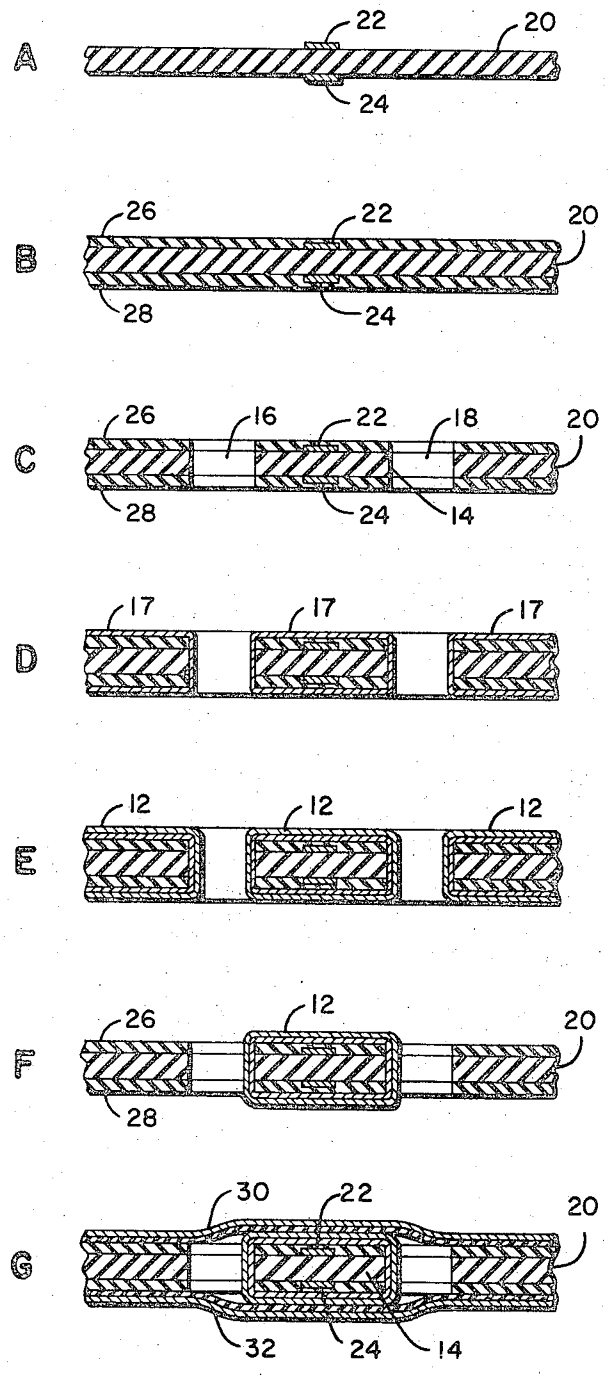
FIG. 8 is a series of views illustrating a typical production memory apparatus which is under preparation in accordance with the technique of FIG. 7, the various figures illustrating the apparatus progressively in various stages of its production and corresponding to the steps which are indicated adjacently in the flow diagram of FIG. 7.

Discussion of an exemplary method of fabrication of the memory apparatus proposed by this invention shall proceed with references to FIGS. 7 and 8. FIG. 7 illustrates a flow diagram of a series of steps which may be followed in preparing the memory apparatus in accordance with a preferred technique of this invention. FIG. 8 illustrates progressively the appearance of the product of this invention during various stages of its fabrication. Each of the illustrations of FIG. 8 are located adjacent the step during which it is formed, as seen in the flow chart of FIG. 7.

As is indicated by the flow chart of FIG. 7, a preferred method of practicing the illustrated embodiment of the present invention commences with the forming or fabrication of a printed circuit member in Step A. The printed circuit member may be formed in accordance with methods well known in the printed circuit art today. For example, a sheet of electrically insulating material having copper foil affixed to the opposite major surfaces thereof may be exposed to the action of a suitable etchant for selectively removing portions of the copper foil, those portions of copper foil remaining after etching forming the printed circuit conductors and such other elements as may be desired. In the preferred embodiment, the insulating material is a sheet of polyethylene terephthalate having a dimension as discussed hereinbefore. Other materials, such as epoxy or phenolic resins, may also be used to form the insulating member.

After forming a printed circuit member in Step A, which exhibits the desired conductor pattern, Step B of the present embodiment is initiated. During this step a layer of insulation is formed over the conductor-bearing surfaces of the printed circuit member such that the conductors are sandwiched between insulating layers for a purpose to become clear hereinafter. The insulating layers 26 and 28 are preferably formed from a suitable material which is in a liquid or semi-liquid state at room temperature and becomes solidified at either room or elevated temperatures and which, when solidified, is an electrical insulator. The insulating material, which in the preferred embodiment is an epoxy resin, may be applied by brushing, spraying, or dipping. In an alternative method, a sheet or film of insulating material, such as polyethylene terephthalate, may be adhesively affixed to be conductor-bearing surfaces of the printed circuit member.

After the applied insulating layer has been cured or otherwise caused to harden, the next step, Step C, of the present invention is performed. During this step a predetermined pattern of rectangularly shaped apertures 16 and 18 is formed in the insulatively coated printed circuit member, these apertures being formed simultaneously by punching. When circular apertures are employed, they may be formed by other techniques, such as drilling. The apertures are arranged in spaced-apart pairs, the members of each pair being disposed on opposite sides of a selected printed circuit conductor. Alternatively, the apertures may be formed before performing Step B of the present invention. For example, the apertures could be formed immediately after the printed circuit member is fabricated, and an insulating layer thereafter applied to the apertured circuit member, proper care being taken to avoid filling the apertures with insulation material.

The next, Step D, of the present invention is a metalizing step performed to form an electrically conductive layer 17 on the insulating layers 26 and 28. The metalizing Step D may be accomplished in accordance with well-known methods in the electroplating art for metalizing insulating or electrically nonconductive material. For example, after pretreating the insulating layers 26 and 28 and the aperture walls, such that the surfaces thereof are adapted to receive a metallic coating, an electrically conductive material 17, such as copper or nickel-phosphorus, may be electrolessly or chemically deposited on these surfaces and the aperture walls. In the preferred embodiment, after proper pre-treatment, the insulating layers 26 and 28 and the aperture walls are coated with a nickel-phosphorus alloy deposited electrolessly from a solution of the following composition:

*Table*

| | | |
|---|---|---|
| $NiSO_4.6H_2O$ (nickel sulphate) | gr./ltr. | 35±3.5 |
| $Na_3C_6H_5O_8.2H_2O$ (sodium citrate) | gr./ltr. | 11.5±1.2 |
| $NaC_2H_3O_2.3H_2O$ (sodium acetate) | gr./ltr. | 35±3.5 |
| $NaH_2PO_2.H_2O$ (sodium hypophosphite) | gr./ltr. | 35±3.5 |
| $MgSO_4.7H_2O$ (magnesium sulphate) | gr./ltr. | 41±4.1 |
| PH | | 4.0±0.5 |
| Temperature, degrees Fahrenheit | | 180±20 |
| Time—sufficient to obtain uniform conductive coating (approximately 2½ min.). | | |

The electrolessly formed metallic coating should exhibit a thickness and degree of continuity adequate to produce suitable conductivity for an electroplating step, which is the next step of the present invention.

In accordance with Step E, the metallically coated printed circuit member is immersed in an electroplating solution having a composition appropriate for depositing a magnetizable metal 12, the metallic coating 17 serving as the cathode onto which the metal 12 is applied in the usual manner. In the preferred embodiment of the present invention the magnetizable material 12 is an alloy having a composition of about 83% nickel and 17% iron. Such a material may be electrodeposited from a solution having an initial composition as follows:

*Table*

| | |
|---|---|
| $NiSO_4.6H_2O$ ---------------------gr./ltr-- | 180±10 |
| $FeSO_4.7H_2O$ ---------------------gr./ltr-- | 8±05. |
| Saccharin -----------------------gr./ltr-- | 0.8±0.05 |
| Temperature, degrees centigrade ----------- | 40±5 |
| Current density -----milliamperes per $cm.^2$-- | 5±0.5 |
| Time—sufficient time to yield a deposit having a thickness in the range of 1000–2000 Angstroms. | |

This solution is periodically analyzed and replenished to maintain the deposition of a magnetizable material 12 having a composition of about 83% nickel and 17% iron.

The next step, Step F, in the operation consists in selectively removing portions of the magnetizable material 12 and the underlying nickel-phosphorus layer 17, namely, those portions which have been formed in areas other than on the web 14. Removal of the undesired magnetizable material and the nickel-phosphorus layer over which it has been deposited is believed best accomplished by etching. In accordance with Step F of the present invention this removal is accomplished by first coating the plated surfaces of the metallically coated printed circuit member with an etchant resist, preferably of the photosensitive type such as is employed in the fabrication of printed circuits. The electroplated member may be coated with the resist material by immersion in a solution thereof, and after drying, the resist is selectively exposed to a light source through a suitable negative. The negative is opaque except for a pattern of rectangularly shaped areas which permit the passage of light, which pattern is registered with respect to the coated printed circuit such that the rectangular area formed on the printed circuit member by the web 14, is covered by the light transparent portions of the negative. Therefore, upon exposure to light the negative permits only the resist material deposited on the web 14 to harden. Upon developing, the unexposed resist is removed and thereafter the plated member is exposed to the action of a suitable etchant, such as a solution of ferric chloride, for removing the undesired metallic material. After the etching has been completed and the cards properly cleaned, the hardened resist, which protected the metallic coatings on the web 14 from the action of the etchant, may be removed by exposure to a suitable solvent. In an alternative method, an etchant resist may be applied by brushing, care being taken to coat only the magnetizable material deposited on the web.

The next step, Step G, of the present invention consists of affixing printed circuit members to opposing major surfaces of the product of the previous step. The printed circuit members may be formed in accordance with methods well known in the printed circuit art today. For example, a sheet of electrically insulating material having copper foil affixed to one of the major surfaces thereof may be exposed to the action of a suitable etchant for selectively removing portions of the copper foil, those portions of copper foil remaining after etching forming the printed circuit conductors which in the present embodiment are arranged in substantially parallel relationship. The printed circuit members are affixed to the product of the previous step by coating the insulating material surface thereof with a suitable adhesive material and pressing the components together care being taken to maintain proper alignment of the copper conductors and the memory element during this operation. As discussed hereinbefore, the following relationships of corresponding word lines 38 and 40, forming a word line pair with memory element 10, are critical limitations for the most efficient operation of memory apparatus 9:

(a) optimum spacing between adjacent word lines 38 and between adjacent word lines 40 for minimum word line cross talk;

(b) aligned, superposed relationship of corresponding word lines forming a word line pair;

(c) minimum spacing between word lines 38 and 40 and memory element 10 for the sharp definition of discrete bit defining circumferential areas;

(d) transverse relationship of word lines 38 and 40 with the longitudinal axis of memory element 10.

In view of the above it is apparent that it is important that the printed circuit members be accurately aligned and properly affixed to the opposing surfaces of the product of FIG. 7, Step F.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

I claim:

1. The method of fabricating a memory apparatus on a first printed circuit member having at least one electrical conductor affixed thereto and having formed therethrough at least a pair of apertures, the members of the pair being disposed on opposite sides of the conductor forming a web therebetween, which method comprises the steps of:

affixing a magnetizable material to the web, the magnetizable material affixed to the web being arranged thereon such that it forms a continuous strip about the web;

affixing second and third printed circuit members, each having a plurality of electrical conductors affixed thereto, to opposing major surfaces of said first printed circuit member with a pair of corresponding conductors of said second and third printed circuit members being in a parallel, superposed relationship in the area of said web and being oriented transverse to said web's longitudinal axis; and, forming a plurality of circumferential memory areas in said continuous strip along said web by separately intercoupling each of said corresponding conductor pairs, each of said memory areas being defined by the superposed portions of the corresponding conductors of said second and third printed circuit members in the area of said web.

2. The method of fabricating a memory element on an electrically insulating material having formed therethrough at least a pair of spaced-apart apertures forming a web therebetween, which method comprises the steps of:

affixing a first pair of susbtantially parallel electrical conductors to said web, the members of the conductor pair being disposed on opposing surfaces of said web;

affixing a magnetizable material to the web, the magnetizable material being arranged thereon such that it forms a continuous strip about the web;

affixing first and second printed circuit members, each having a plurality of electrical conductors affixed thereto, to opposing major surfaces of said electrically insulating material with corresponding conductors of said first and second printed circuit members being in a parallel, superposed relationship in the area of said web and oriented transverse to said web's longitudinal axis; and, forming a plurality of circumferential memory areas in said continuous strip along said web by separately intercoupling each of said two corresponding conductors, each of said memory areas being defined by the superposed portions of said corresponding conductors of said first and second printed circuit members in the area of said web.

3. The method of fabricating memory elements on an electrically insulating substrate member, which method comprises the steps of:

forming at least one electrical conductor on the substrate member;

affixing a layer of electrical insulation to the conductor-bearing surface of the substrate member such that the conductor is sandwiched between the substrate member and insulation layer;

forming at least a pair of apertures in the substrate member, the apertures being arranged on opposite sides of the electrical conductor for forming a web portion therebetween;

affixing a magnetizable material to at least the web portion therebetween forming a tubular memory element thereby;

affixing first and second printed circuit members, each having a plurality of electrical conductors affixed thereto, to opposing major surfaces of said substrate member with corresponding conductors of said first and second printed circuit members being in a parallel, superposed relationship in the area of said web and oriented transverse to said web's longitudinal axis; and, forming a plurality of circumferential memory areas along said tubular memory element by separately intercoupling each of said two corresponding conductors, each of said memory areas being defined by the superposed portions of said corresponding conductors of said first and second printed circuit members in the area of said web.

4. The method of fabricating memory elements on an electrically insulating substrate member, which method comprises the steps of:

disposing at least one electrical conductor on the substrate member;

affixing a layer of electrical insulation to the conductor-bearing surface of the substrate member such that at least a predetermined portion of the conductor is sandwiched between the substrate member and the insulation layer;

forming at least a pair of apertures in the substrate member, the apertures being arranged on opposite sides of the electrical conductor for forming a web portion therebetween, which web portion includes the predetermined portion of the conductor sandwiched between the substrate member and the insulating layer;

affixing a layer of current conducting material to at least the web portion between the apertures;

electrodepositing a layer of magnetizable material upon the current conducting layer forming a tabular memory element about said web;

affixing first and second printed circuit members, each having a plurality of electrical conductors affixed thereto, to opposing major surfaces of said substrate member with corresponding conductors of said first and second printed circuit members being in a parallel, superposed relationship in the area of said web and oriented transverse to said web's longitudinal axis; and, forming a plurality of circumferential memory areas along said tubular memory element by separately intercoupling each of said two corresponding conductors, each of said memory areas being defined by the superposed portions of said corresponding conductors of said first and second printed circuit members in the area of said web.

5. The method of fabricating memory elements on an electrically insulating substrate member, which method comprises the steps of:

disposing at least one electrical conductor on the substrate member;

affixing a layer of electrical insulation to the conductor-bearing surface of the substrate member such that at least a predetermined portion of the conductor is disposed between the substrate member and the insulation layer;

forming at least a pair of apertures in the substrate member, the apertures being arranged on opposite sides of the electrical conductor for forming a web portion therebetween, which web portion includes the predetermined portion of the conductor disposed between the substrate member and the insulation layer;

forming a current conducting layer on the insulatively coated substrate member;

electrodepositing a magnetizable material upon the current conducting layer;

thereafter removing selected portions of the current conducting layer and magnetizable material such that portions of these materials not removed appear only on the web portion therebetween forming a tubular memory element about said web;

affixing first and second printed circuit members, each having a plurality of electrical conductors affixed thereto, to opposing major surfaces of said substrate member with corresponding conductors of said first and second printed circuit members being in a parallel, superposed relationship in the area of said web and oriented transverse to said web's longitudinal axis; and, forming a plurality of circumferential memory areas along said tubular memory element by separately intercoupling each of said two corresponding conductors, each of said memory areas being defined by the superposed portions of said corresponding conductors of said first and second printed circuit members in the area of said web.

References Cited

UNITED STATES PATENTS

| | | | |
|---|---|---|---|
| 3,110,087 | 11/1963 | Rajchman | 29—604 |
| 3,138,785 | 6/1964 | Chapman et al. | |
| 3,142,047 | 7/1964 | Henderson. | |
| 3,196,416 | 7/1965 | Williams. | |
| 3,206,732 | 9/1965 | Briggs | 29—604 X |
| 3,055,770 | 9/1962 | Sankuer et al. | |
| 3,206,342 | 9/1965 | Briggs | 29—604 |

JOHN F. CAMPBELL, *Primary Examiner.*

D. C. REILEY, *Assistant Examiner.*